2 Sheets—Sheet 1.

A. A. FISHER & A. HART,

Assignors to the PACIFIC TUCKING AND MANUFACTURING COMPANY.

SEWING MACHINE.

No. 10,535. Reissued Oct. 28, 1884.

Attest;
S. Walter Fowler
H. B. Appleyhaite,

Inventors;
A. A. Fisher,
and
Albert Hart
by their Attys.
A. H. Evans & Co.

N. PETERS, Photo-Lithographer, Washington, D. C.

A. A. FISHER & A. HART,

Assignors to the PACIFIC TUCKING AND MANUFACTURING COMPANY.

SEWING MACHINE.

No. 10,535. Reissued Oct. 28, 1884.

Attest;
T. Walter Fowler
H. B. Applewhaite,

Inventors
A. A. Fisher,
and Albert Hart,
by their Attys.
A. H. Evans & Co.

N. PETERS, Photo-Lithographer, Washington, D. C.

UNITED STATES PATENT OFFICE.

ALFRED A. FISHER AND ALBERT HART, OF SAN FRANCISCO, CALIFORNIA, ASSIGNORS TO THE PACIFIC TUCKING AND MANUFACTURING COMPANY, OF SAME PLACE.

SEWING-MACHINE.

SPECIFICATION forming part of Reissued Letters Patent No. 10,535, dated October 28, 1884.

Original No. 299,368, dated May 27, 1884. Application for reissue filed August 26, 1884.

*To all whom it may concern:*

Be it known that we, ALFRED A. FISHER and ALBERT HART, of the city and county of San Francisco, and State of California, have invented an Improvement in Sewing-Machines; and we hereby declare the following to be a full, clear, and exact description thereof.

Our invention relates to certain new and useful improvements in sewing-machines; and these consist in means operated by the thread of the machine for throwing the power device out of gear with the sewing-machine upon the breaking of the thread, as we shall hereinafter fully explain, reference being had to the accompanying drawings, in which—

Figure 1:
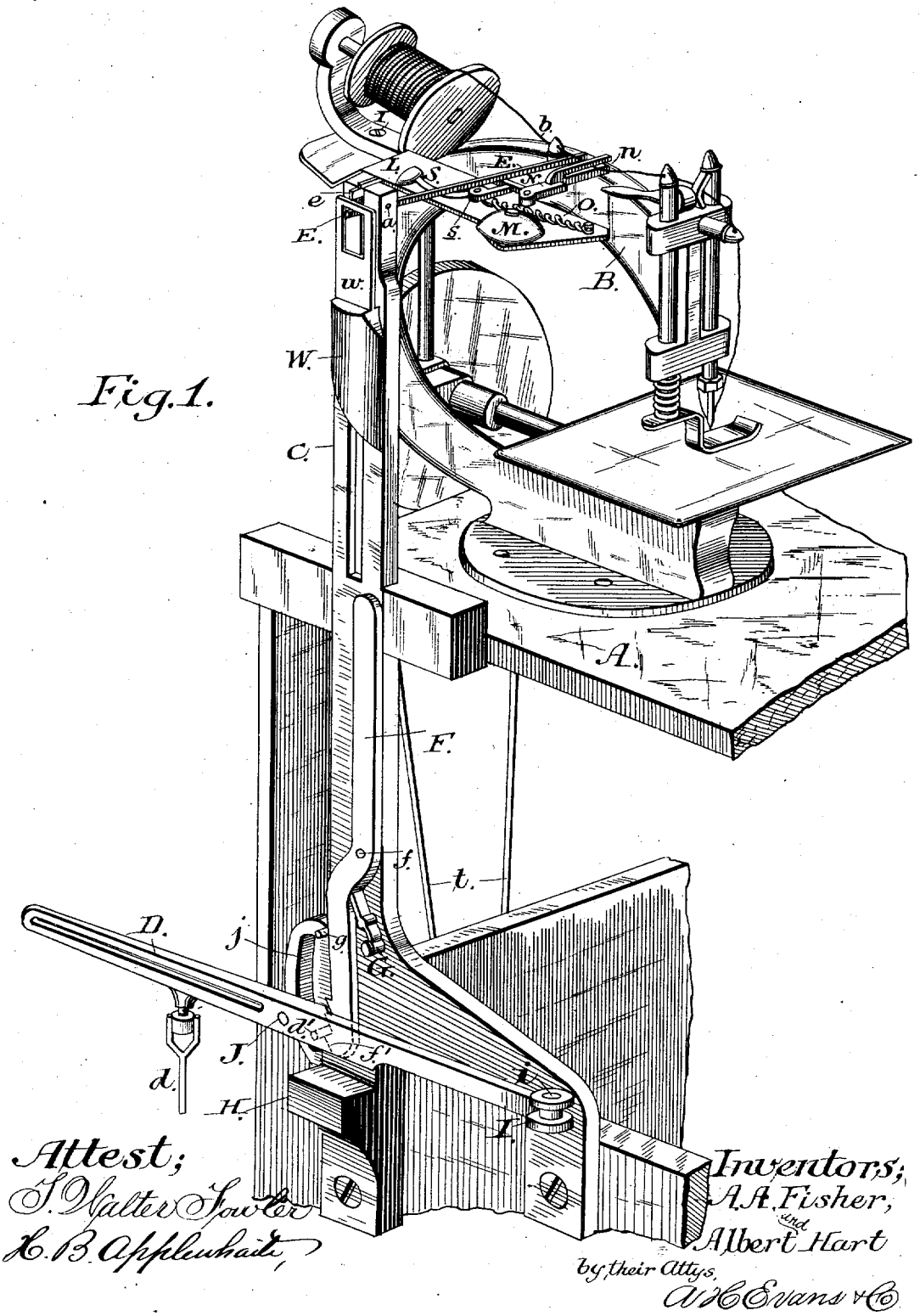
Figure 2:
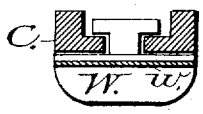
Figure 3:
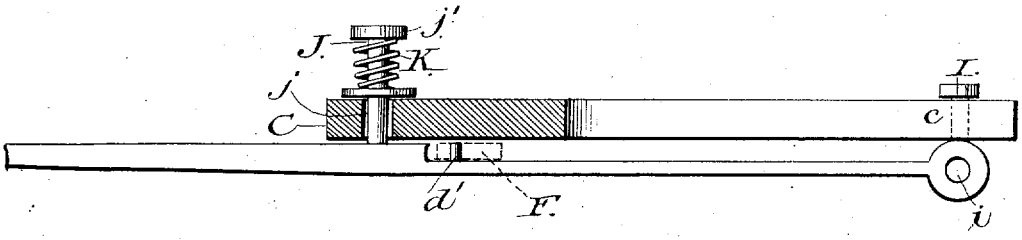
Figure 4:
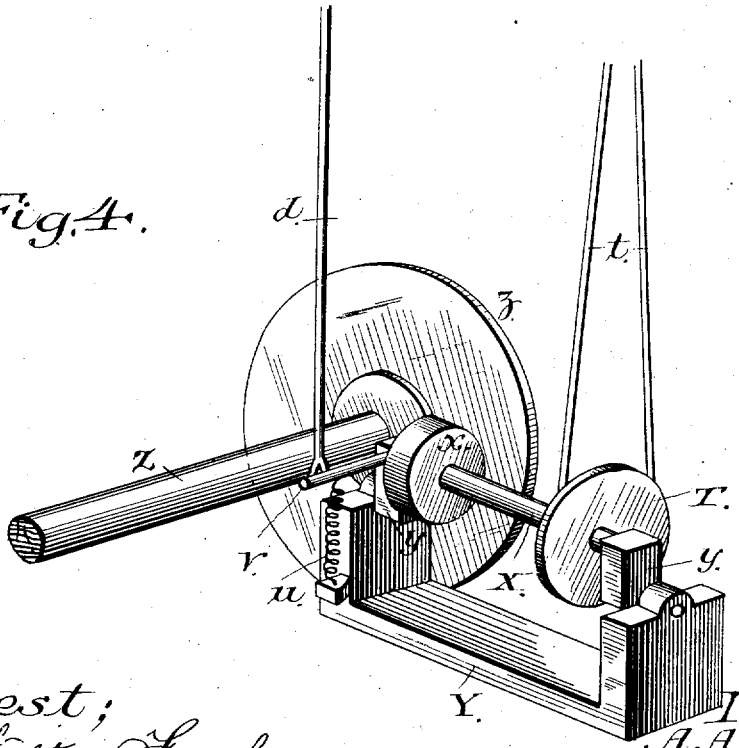

Figure 1, Sheet 1, is a perspective view of our improvements. Fig. 2, Sheet 2, is a cross-section through the weight W and slotted standard C. Fig. 3 is a plan of lever D and a section through the standard C, showing the slotted guide *j* and showing bolt J. Fig. 4 shows a power device, which is thrown in or out of gear by the lever D.

A is a table upon which the sewing-machine B is secured.

C is a standard secured to the side of table A, and extending downwardly.

D is a lever connected by means of the wire *d* with any suitable devices below, which, by the movement up or down of said lever D, will be thrown into or out of gear with the sewing-machine. In Fig. 4 we have illustrated a device of this character in order to show more perfectly the effect of our invention upon the lever D and sewing-machine.

Z is the driving shaft, carrying a large friction-wheel, *z*.

Y is a stand in which are mounted to oscillate the small bearing-blocks *y*, in which is journaled the shaft X. This shaft carries a small friction-wheel, *x*, and a pulley, T, from which a belt, *t*, extends to the driving-wheel of the sewing-machine. A lever, *v*, is attached to one of the rocking bearing-blocks *y*, and to the end of this lever the wire *d* from the lever D is secured. A spring, *u*, is attached to the lever *v* and to the stand Y, and operates to draw down upon said lever, thus rocking the bearing-blocks *y*, and holding the friction-wheel *x* away from the friction-wheel *z*, in which case motion is not transmitted to the sewing-machine. This effect of the spring can only take place when the wire *d* is slackened by the lowering of lever D above; but when said lever is raised the wire *d* draws up the lever *v*, rocks the bearings *y*, and forces the small friction-wheel against the large one, and thus transmits motion to the sewing-machine. We claim nothing for this mechanism, as it is well known; but we have described it, as before stated, to show more clearly the operation of our invention.

Pivoted at *a* in the top of standard C is an arm, E, the long end of which extends toward and above the presser and needle arms of the machine, but under the thread *b*, as shown in Fig. 1. Its short end projects beyond the standard a short distance.

W is a weight guided in the standard C, which is slotted for that purpose, as seen in Fig. 2. The upper end of the weight is adapted to be hung up on the short end of arm E, and to facilitate its engagement we secure a slotted spring-strip, *w*, in the top of weight. This strip, besides suspending the weight from the arm, renders it easy to suspend it from a stationary pin, *e*, in the top of the standard C, while the arm E is being adjusted. The weight, being fixed in guides, cannot move outwardly to be hung over the arm or pin; but the spring-strip can easily be pressed out to engage with either. The lower end of weight W is beveled, as shown.

F is the ratchet-lever. This is pivoted at *f* to the standard C. Its upper end lies under the weight and receives it when dropped. Because of the bevel of said weight the top of the ratchet-lever, when the weight is dropped, is forced to one side. The lower end of this lever is provided with teeth, as shown, with which a pin, *d'*, on the lever D engages to hold said lever up. A spring, G, holds the ratchet-lever F to its engagement, and a small stop, *g*, limits its movement when released from pin *d*.

The operation of the devices we have described is as follows: The tension of the thread *b* when the machine is in operation is sufficient to hold the long end of the arm E down, and thus said arm supports the weight W, which is suspended from its short end, Fig. 1, but when the thread breaks, the arm E, being relieved, it trips the weight, which drops down upon the upper end of the ratchet-lever F, forcing it to one side. This movement throws its lower or ratchet end in an opposite direction, whereby it becomes disengaged from pin *d'*, and the lever D thereupon falls down, slacking wire *d*, and, as before explained, throws the power device out of gear with the machine, which is thus stopped. Upon raising lever D again the pin *d'* travels up an inclined edge, *f'*, of ratchet-lever F, forcing it to one side until it engages with its teeth, whereupon the machine is started again. The lever D, in dropping, is received upon a buffer, H, as shown.

It is necessary at times to stop the machine for other causes than the breaking of the thread, and if no other provision were made it would be difficult to release the pin *d'* from the ratchet-lever simply by moving the lever D. To accomplish this we pivot the end of lever D in such manner that it may be moved in a horizontal as well as in a vertical direction. This is shown in Figs. 1 and 3. An eyebolt, I, passes through a cross-base, *c*, of standard C. The end of lever D is slotted on the eye of said bolt, and is pivoted thereon by a small pin, *i*. The eyebolt, which is a pivot, provides for the vertical movement of the lever, while the small pin provides for its side or horizontal movement. In this way the lever D may be released from the ratchet-lever by a side motion when desired. Having such a motion, it becomes necessary to hold said lever normally against the side of the standard in order to cause its pin *d'* to engage with the ratchet-lever. This is done by a bolt, J, Fig. 3, which passes through the lever and through a slotted bearing or guide, *j*, on the side of the standard C. It has a spring, K, on its end, which operates against the back of the guide *j*, and a nut, *j'*, on the bolt to hold the lever D in position.

Having thus described our invention, what we claim as new, and desire to secure by Letters Patent, is—

1. In a sewing-machine, a lever, by the operation of which a power device is thrown in and out of gear with said sewing-machine, in combination with an arm held in position by the thread of the sewing-machine, a weight sliding in guides and tripped by the release of said arm upon the breaking of the thread, and a means affected by the falling weight for operating said lever to throw the power device out of gear with the sewing-machine, substantially as herein described.

2. In a sewing-machine, a lever, by the operation of which a power device is thrown in and out of gear with said sewing-machine, in combination with an arm held in position by the thread of the sewing-machine, a vertically-sliding weight tripped by the release of said arm upon the breaking of the thread, and a swinging ratchet-lever engaging with the power-lever and operated by the falling weight to disengage and release said power-lever to throw the power device out of gear with the sewing-machine, substantially as described.

3. In a sewing-machine, the pivoted lever D, having a pin, *d'*, and connected with the power device and operating to throw said power device in and out of gear with the sewing-machine, in combination with the standard C, the arm E, pivoted in its top and having one end extending under the thread of the machine, the sliding weight W in the standard, adapted to be suspended from the other end of said arm and having a beveled lower end, and the pivoted ratchet-lever, F, adapted to receive the weight W upon its upper end and to engage with the pin *d'* of lever D with its lower end, substantially as and for the purpose herein described.

4. In a sewing-machine, the power-lever D and slotted standard C, having a pin, *e*, at its top, in combination with the pivoted arm E, the weight W, having a slotted spring-strip, *w*, whereby it is suspended from pin *e* or arm E at will, and the pivoted ratchet-lever F, all arranged and operating substantially as and for the purpose herein described.

5. In a sewing-machine, the standard C and the power-lever D, having pin *d'*, horizontal pivot I, and vertical pivot *i*, in combination with ratchet-lever F, substantially as and for the purpose herein described.

6. In a sewing-machine, the standard C, having slotted guide *j*, and the power-lever D, having pin *d'*, horizontal pivot I, and vertical pivot *i*, and the bolt J, passing through said lever and slotted guide and having a spring, K, in combination with the ratchet-lever F, having spring G, and the stop *g*, substantially as and for the purpose herein described.

In testimony whereof we affix our signatures in the presence of two witnesses.

ALFRED A. FISHER.
ALBERT HART.

Witnesses:
T. WALTER FOWLER,
H. B. APPLEWHAITE.